UNITED STATES PATENT OFFICE.

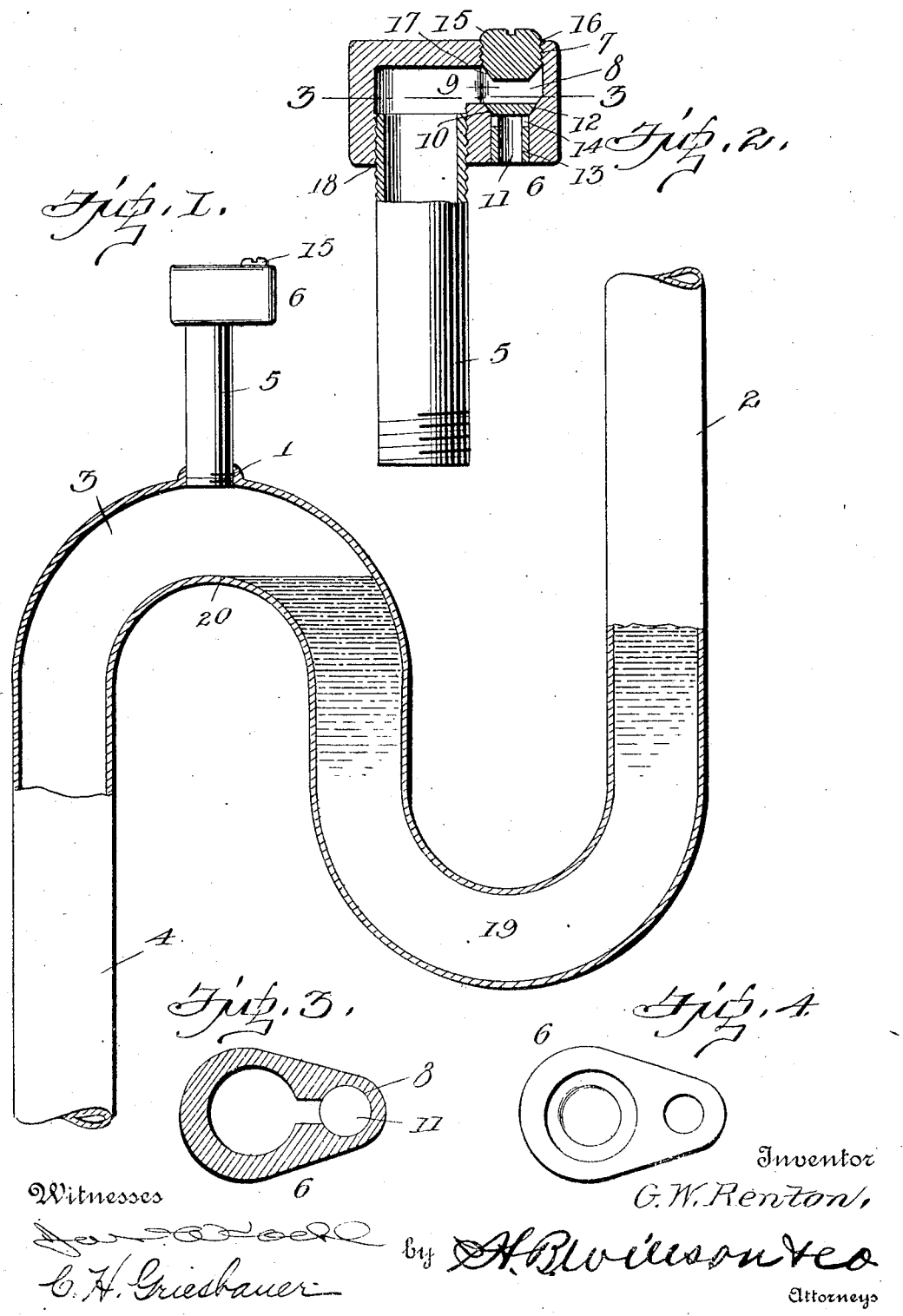

GEORGE W. RENTON, OF BROOKLYN, NEW YORK.

AIR-VALVE FOR STENCH OR WATER-SEAL TRAPS.

No. 878,424.  Specification of Letters Patent.  Patented Feb. 4, 1908.

Application filed June 6, 1907. Serial No. 377,575.

*To all whom it may concern:*

Be it known that I, GEORGE W. RENTON, a citizen of the United States, residing at Brooklyn, in the county of Kings and State of New York, have invented certain new and useful Improvements in Air-Valves for Stench or Water-Seal Traps; and I do declare the following to be a full, clear, and exact description of the invention, such as will enable others skilled in the art to which it appertains to make and use the same.

My invention has relation to new and useful improvements in air valves for stench or water seal traps; and has for its object to provide a simple and inexpensive device of this character for preventing the siphonage which takes place in the common stench or water seal trap, so as to prevent back flow of sewer gas in the room in which the air valve is located.

With the foregoing and other objects in view, the invention consists of certain novel features of construction, combination and arrangement of parts, as will be more fully described and particularly pointed out in the appended claims.

In the accompanying drawings,—Figure 1 is a sectional elevation of a common stench or water seal trap with my invention attached in position thereto; Fig. 2 is a sectional elevation of my invention; Fig. 3 is a cross sectional view of the valve-carrying member on the line 3—3 of Fig. 2; Fig. 4 is a bottom plan view of the valve-carrying member.

The numeral 1 is a screw-threaded orifice or opening in the pipe 2 through which by means of my invention I attempt free passage of air into the pipe, and at the same time prevent the outflow of water, gas or air.

3 is the air space in that portion of the pipe which forms the water seal of the common stench trap, which air space is formed when the outward or downward flow of water has ceased, by passing through the drain or water pipe 4. A vertically projecting pipe or tube 5 constituting one of the elements of my invention is screwed at its lower exteriorly threaded end in the orifice or opening 1 in said pipe 2, and is exteriorly threaded at its upper end, the purpose of which will be shown.

A valve-carrying member 6 of preferably conical form with curved ends when viewed in top or bottom plan is provided in its upper face or top, near its small end, with a central vertical interiorly threaded bore 7, and with a vertical valve opening 8 extending from the bottom of the valve-carrying member and communicating with the lower end of the bore. Said valve opening is of somewhat less diameter and is arranged concentric with said bore, leaving an annular shoulder 9 between the inner ends of said valve opening and bore, 8 and 7, respectively, the inner part of which is chamfered or cut away at a suitable angle to provide an inclined valve seat 10. A valve 11, having a bearing surface 12 to correspond with said valve seat 10, normally fits over and closes the inner end of said valve opening 8, the inner end or top of said valve extending slightly above the valve seat so that the slightest pressure will lift it from its seat. Said valve is provided with a tubular guide stem or plunger 13, which works loosely in said valve opening 8 and is provided near its upper end with two oppositely disposed alining side ports 14, the purpose of which will be shown.

A plug having a recessed head 15, exteriorly threaded body 16, and a reduced end 17 of preferably conical form screws in said vertical bore 7 of the valve-carrying member, and its inner end limits the upward movement of said valve 11. Said valve-carrying member is also provided in its bottom near its enlarged end with a central vertical bore 18, which is screw-threaded near its lower end to enable the valve-carrying member to be screwed on the upper exterior screw-threaded end of said pipe or tube 5.

A longitudinal air passage extends from the upper end of said bore 18 and communicates with the inner end of said vertical bore 7, and thereby permits air to pass from the valve opening to the pipe or tube 5 when the valve is raised or lifted from its seat.

In the common stench trap or water seal traps the discharge pipe 5 forms a long arm of a siphon, and when the siphon water has passed from the passage down to the level of the upper curve of the water trap at 19 the suction of the discharge pipe 4 acting as a powerful siphonage removes the water from the trap until it is below the level of the lower curve 20 of the water trap, when air is admitted, which prevents the further removal of water and permits the escape of the deadly gases of the sewer through the trap; and my invention is for the purpose of avoiding this siphonage and produce an absolutely gas tight trap.

The operation of my invention is as follows:—Waste water passing down the pipe 2 passes through the trap. The valve 11 closes the upper end of the valve opening 8 and prevents air or gas in the pipe from passing out of the valve-carrying member. When the water by escaping through the educt pipe 4 has been lowered in the water trap to the level of the upper curve 19 of the water trap, the suction of the discharge pipe 4 causes the valve to raise from its seat, when air is freely admitted through the pipe or tube 5 into the pipe at 3 and prevent the siphonage of the water in the trap.

A particular feature of my invention resides in the fact that all liability of the valve becoming deranged or inoperative is eliminated, as the operation of the valve does not depend upon the employment of springs or such other unreliable means. It will also be noted that the construction of the valve is such that it will raise and disclose the inner or upper end of the valve opening 9 and thereby supply air to the pipe 2 to seal the trap by the slightest pressure thereon.

Having thus described my invention, what I claim as new and desire to secure by Letters-Patent, is:—

1. In an air valve for water seal traps, an upright tube adapted to be connected with the longer leg of the trap, a horizontally disposed valve carrying member of conical form with curved ends in horizontal section screwing on the upper end of the tube near its large end and having a vertical valve opening in its bottom near its small end, and a longitudinal air passage for establishing communication between said valve opening and the tube, a valve normally closing the inner end of the valve opening, and having a tubular stem with diametrically opposite ports working therein, and a plug screwing in the top of the valve carrying member for limiting the vertical movement of the valve.

2. An air valve for water seal traps, a tube adapted to be connected with the longer leg of the trap, a horizontally disposed valve carrying member of tapering form in horizontal section, having a vertical screw threaded bore in its top near its small end, a valve opening in its bottom, communicating with said bore, a screw threaded bore in its bottom near its large end, and a longitudinal air passage communicating with the valve opening and said last mentioned bore, a valve normally closing the inner end of the valve opening and having a tubular stem with air ports to work therein, and a plug screwing in said first mentioned bore for limiting the vertical movement of the valve.

In testimony whereof I have hereunto set my hand in presence of two subscribing witnesses.

GEORGE W. RENTON.

Witnesses:
   GEO. L. WHITE,
   ABRAHAM BRINKERHOFF.